INVENTOR.
MELVIN L. DOELZ
BY Marvin Moody
ATTORNEY

Nov. 20, 1956 M. L. DOELZ 2,771,545

MULTIPLE FREQUENCY COMMUNICATION SYSTEM

Filed Nov. 3, 1951 3 Sheets-Sheet 2

INVENTOR.
MELVIN L. DOELZ
BY Marvin Moody
ATTORNEY

Nov. 20, 1956 M. L. DOELZ 2,771,545

MULTIPLE FREQUENCY COMMUNICATION SYSTEM

Filed Nov. 3, 1951 3 Sheets-Sheet 3

INVENTOR.
MELVIN L. DOELZ
BY Marvin Moody
ATTORNEY

United States Patent Office 2,771,545

Patented Nov. 20, 1956

2,771,545

MULTIPLE FREQUENCY COMMUNICATION SYSTEM

Melvin L. Doelz, Glendale, Calif., assignor to Collins Radio Company, Cedar Rapids, Iowa, a corporation of Iowa Application November 3, 1951, Serial No. 254,736

4 Claims. (Cl. 250—8)

This invention relates in general to a communication system and in particular to an improved system which allows intelligence to be transmitted when there is a low signal to noise ratio.

A 12 decibel signal to noise ratio is required to determine with near certainty the presence or absence of a single pulse. The longer time that a pulse is transmitted, assuming the same power, the greater is the possibility of correct detection. For example, binary synchronized teletype systems use five pulses to determine one letter or character and the characters may be coded into mark-space code with a different frequency corresponding to the mark and the space. However, if only one pulse need be transmitted to determine a letter, the speed of transmission will be appreciably increased and a smaller amount of energy will be required to transmit the letter with one pulse than in five pulses. Suppose, for example, that each letter is distinguished by a particular frequency transmitted during the pulse interval. All written intelligence may be transmitted by the use of 32 characters and thus if 32 frequencies are chosen each pulse will be recognized by the particular frequency of each pulse. In the presence of most types of noise detection of a pulse is closely associated with the energy of the pulse and to a close approximation only one fifth of the energy is required to send a character with the 32 frequency system as compared with the two frequency system. The bandwidth, however, must be greater in the 32 frequency system than in the binary system because each frequency must be recognized. The bandwidth is in the ratio of 16 to 5. This is true because the pulses in the binary system are only ⅕ as long as in the 32 frequency system and thus five times the band width is required for each of the two frequencies as compared to the 32 frequency system. If we take the band width required for each of the 32 frequencies as unity then we have 32 units of band width required for the 32 condition system as compared to two bands each of 5 units width or 10 units for the two condition system. Thus the binary system requires $\frac{10}{32}$ or $\frac{5}{16}$ as much bandwidth as the 32 frequency system.

It is an object of this invention, therefore, to provide a communication system wherein a different frequency is used for each character of the alphabet.

Another object of this invention is to provide a communication system which utilizes the principles of kinematic detection.

The term kinematic detection is used here to describe detection processes in which kinematic means are used to weight the past history of the incoming signal. Linear filters using inductance and capacity elements yield an output which is proportional to the product of a weighting function, say $Q(t)$, multiplied by the incoming signal and integrated over the time preceding the instant of sampling. The weighting function $Q(t)$ is associated with the structure of the filter and is completely descriptive of the electrical properties of the filter. When the weighting function is obtained by energy storage in inductance and capacity elements the process is purely dynamic while if the weighting function is produced in whole or in part by a kinematic method, for example by multiplying the incoming signal by a locally prepared weighting function with the aid of an electronic product device, the process is called a kinematic process.

The performance of the detection system in noise is critically dependent on obtaining the proper weighting function $Q(t)$. This is frequently extremely difficult if not impossible by dynamic methods but may be accomplished with relative ease by kinematic means such as those described herein.

Yet another object of this invention is found in the provision for a communication system which uses mechanical resonators for increasing the signal to noise ratio to thus allow transmission in the presence of noise which would normally make communication impossible.

A feature of this invention is found in the provision for a transmitter which sends pulses with each pulse containing a particular frequency representing a particular letter of the alphabet and a receiver which weighs the incoming pulses by modulating them and passing them to a plurality of mechanical resonators which are tuned to the frequencies of the letters and detecting means which detect which of the resonators is excited by a particular pulse.

Further objects, features and advantages of this invention will become apparent from the following description and claims when read in view of the drawings in which;

Figure 1:
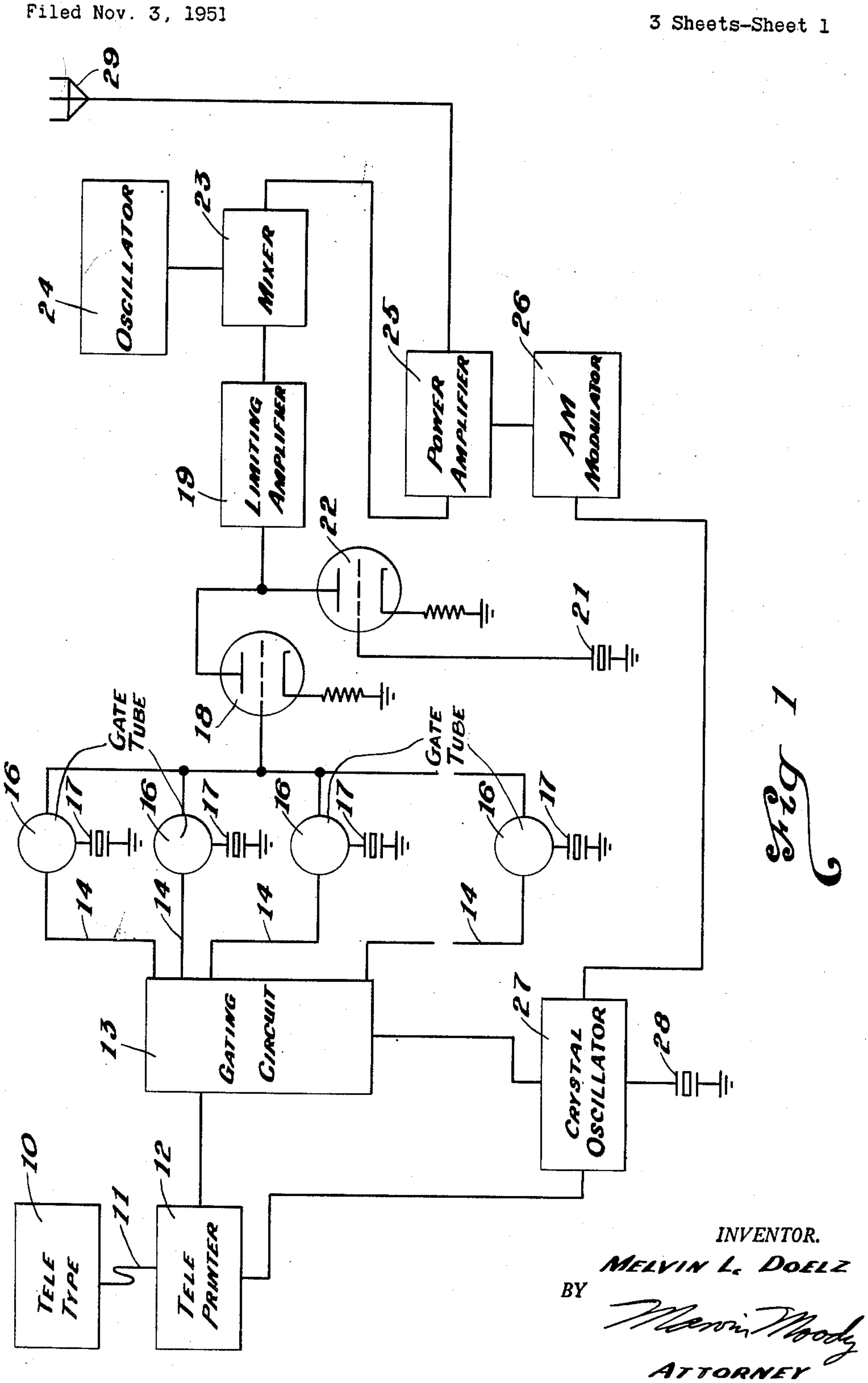
Figure 1 is a diagrammatic view of the transmitter of this invention.

Figure 1 illustrates the transmitter of this invention and comprises a teletype machine 10, of the conventional type which produces a tape 11, with the intelligence printed on it. The tape 11 passes to a teleprinter 12 which produces an output that is fed to a group of gating circuits 13.

The gating circuits 13 have thirty-three output leads 14 which are each connected to a gate tube 16. Each gate tube 16 receives an input from a crystal oscillator 17 and allows the output of the crystal oscillator to pass when the particular gate tube is energized by the teleprinter 12 and the gating circuits 13.

The output of the gate tubes 16 are connected in parallel and each time a character is sent by the teleprinter, one of the gate tubes 16 will be gated to allow the output of its particular oscillator to pass. The outputs of the gating tubes passes to a tube 18 which amplifies it and passes it to a limiting amplifier 19 that clips the output at a predetermined level.

A crystal 21 oscillates at a frequency different from the thirty-three other crystals and supplies an output to the control grid of a tube 22. The output from tube 22 is fed to the input of the limiting amplifier 19 at a lower voltage level than the output of tube 18. Limiting amplifiers have the property of suppressing in their output the weaker of two signals supplied to their input. This allows the output of the crystal 21 to be amplified and passed through limiting amplifier 19 when communication is not being sent by the teleprinter.

The output of limiting amplifier 19 passes to a mixer 23 which receives an imput from an oscillator 24 to heterodyne it up to an R.-F. frequency. The output of the mixer 23 is supplied to an output power amplifier 25.

Means are thus provided for sending a different frequency for each letter of the alphabet but in order to eliminate undesirable transients which would occur if the frequency changes were to occur at periods of high output power, it is desirable to 100 per cent amplitude modulate the power amplifier 25 so that the changes in frequency will occur in the modulation trough when the power output is essentially zero.

For this purpose an AM modulator 26 100 percent modulates the power amplifier 25 at a contant rate, as for example, 55 cycles per second. The modulation produced by the AM modulator 26 might have the form of a sine wave, forming cosine squared pulses, for example.

The modulator 26 must be synchronized with the change in frequency. This is accomplished by means including a crystal oscillator 27 which is controlled by a crystal 28. The crystal oscillator 27 supplies a 55 cycles per second signal to the teleprinter 12, the gating circuits 13 and the AM modulator 26. This signal synchronizes the various portions of the system.

The output of the power amplifier 25 is supplied to an antenna 29 which radiates the signal.

Figure 2:
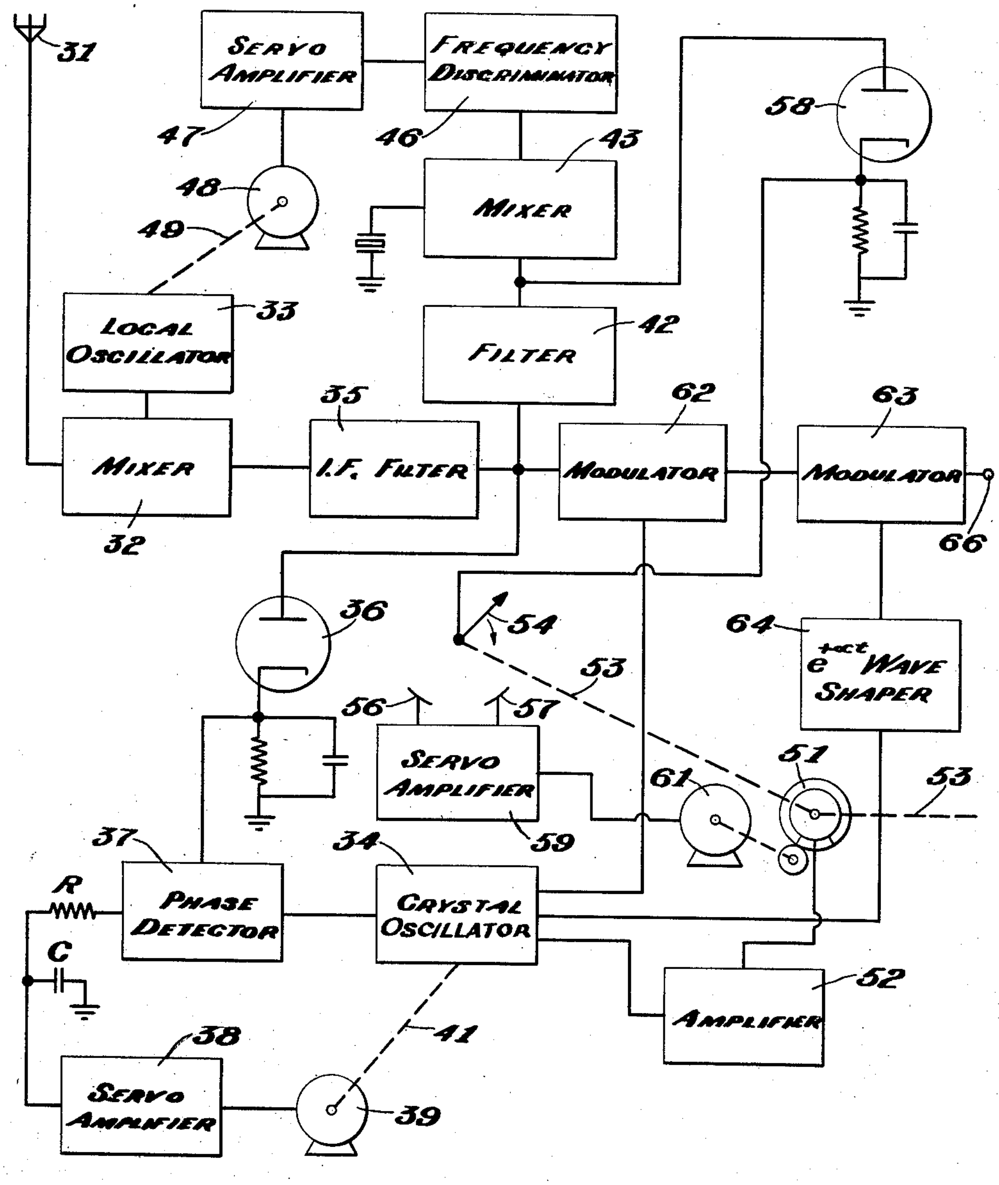
Figure 2 is a diagrammatic view of a portion of the receiver of this invention.
Figures 3, 4:
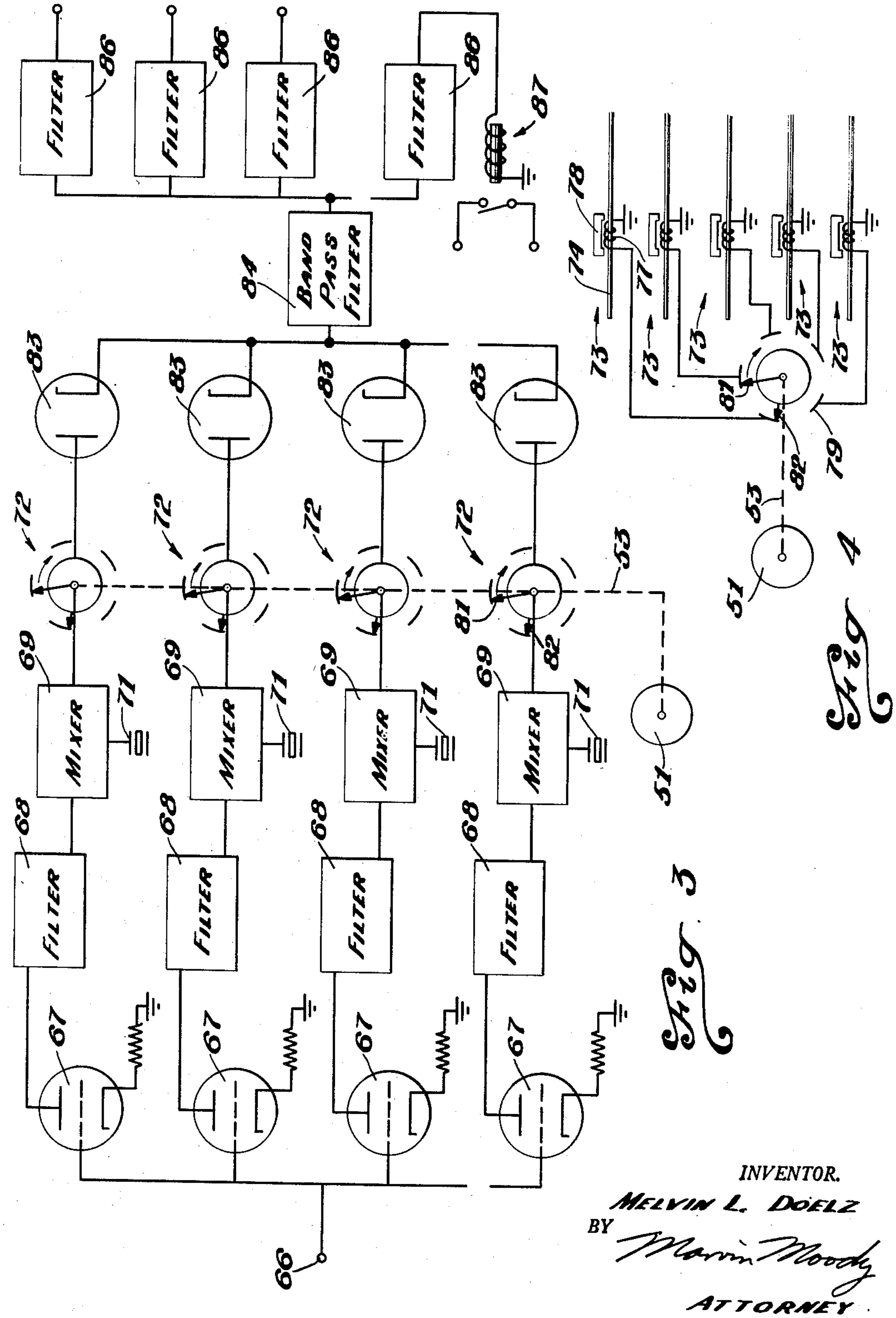
Figure 3 is a diagrammatic view of this invention.
Figure 4 is a detailed view of the mechanical resonators of this invention.

The receiver of this communication system is shown in Figures 2 and 3 and comprises, the receiving antenna 31 which receives the intelligence and supplies it to a mixer 32 that receives a second input from a local oscillator 33 to heterodyne the signal down.

A crystal oscillator 34 provides a synchronizing signal for the receiver and oscillates at 55 cycles per second. To assure synchronism between the crystal oscillator 27 at the transmitter and the crystal oscillator 34 at the receiver, the output of the mixer 32 is fed to a diode detector 36 through an I. F. filter 35 and to a phase detector 37.

The phase detector 37 also receives an input from the crystal oscillator 34. The phase detector 37 produces an output proportional to the cosine of the phase angle between the crystal oscillator 34 and the modulation envelope of the incoming signal. The output of the phase detector is filtered through a low pass R. C. filter and furnished to a servo amplifier 38 which produces an output signal for a servomotor 39. The servomotor 39 is connected to a shaft 41 which varies the phase of the crystal oscillator 34 so that synchronism is obtained.

One of the 33 signals from the group of oscillators at the transmitter is used as a reference pulse for assuring that the frequencies transmitted for each character will be recognized and at the right frequency after heterodyning at the receiver. The frequency of this reference pulse might be, for example, 338 kilocycles. Periodically the reference pulse is transmitted and the frequency of the local oscillator 33 is controlled by the reference pulse. The I. F. filter 35 passes signals between 200 and 350 kilocycles which allows signals from the 33 oscillators 17 and the oscillator 21 to pass but filters out extraneous frequencies.

A second filter 42 receives a portion of the output of I. F. filter 35 and passes a narrow band between 337–339 kilocycles. This assumes that the reference signal is 338 kilocycles and that all other signals are outside the 337–339 kilocycle range.

A mixer 43 receives the output of filter 42 and a second input from a crystal oscillator 44 at 328 kilocycles which gives an output from the mixer of 10 kilocycles. The output of the mixer 43 is fed to a discriminator centered at 10 kilocycles which yields a positive voltage output if the signal pulse is higher than 338 kc. and negative if lower. A servo amplifier 47 receives the output of discriminator 46 and supplies an input to a second servomotor 48.

The servomotor 48 varies the frequency of local oscillator 33 through shaft 49.

The crystal 34 supplies an output to a synchronous motor 51 through an amplifier 52. The output shaft 53 of motor 51 drives a brush 54 which engages a pair of contacts 56 and 57 as it rotates. The brush 54 receives an electrical input from a diode 58 which rectifies the output of filter 42. A servo amplifier 59 is connected to contacts 56 and 57 and produces an output proportional to the difference in energy supplied by the brush 54 to the contacts. A motor 61 receives the output of servo amplifier 59 and it has an output shaft 62 which is geared to the mounting of motor 51 to adjust the phase of the shaft 53.

It is to be noted that only one of the 34 incoming frequencies has been used in the synchronizing links and the other thirty-three frequencies pass from I. F. filter 35 to a first modulator 62 which receives a cosine squared input from the crystal clock 34. The incoming signal is modulated by the cosine squared wave and passed to a second modulator 63. It is to be realized that a cosine squared wave is a cosine wave which has been displaced from the origin by a D. C. level of unity. This may be shown from the identity that the $$\cos^2 \omega = 1 + 2 \cos \frac{\omega}{2}$$

The crystal clock 34 furnishes a cosine wave output to the modulator 62.

The modulator 63 receives an input from a wave shaper 64 which has a wave shape of $e^{+at}$. The wave shaper 64 receives an input from the crystal oscillator 34. The modulator 63 modulates the received signal with the $e^{+at}$ wave.

The principles of kinematic detection are used in this invention so as to obtain satisfactory operation with the lowest possible signal to noise ratio. For ideal detection, the incoming signal must be weighed according to its expected shape. In as much as magneto strictive mechanical resonators are to be used as the detecting means, the incoming signal is modulated by the cosine squared and $e^{+at}$ wave shapes. Mechanical resonators vibrate in harmonic motion which decays exponentially according to $e^{-at}$ and the incoming wave is modulated by $e^{+at}$ to compensate for this decay. Since the expected incoming wave is a series of cosine squared pulses it is modulated (multiplied) by another similar series of pulses in synchronism with the incoming wave.

The output of modulator 63 is furnished to a terminal 66 which connects to the apparatus of Figure 3. Thirty-three channels are connected to terminal 66 and each has an amplifier tube 67. After each amplifier is a band pass filter 68 each tuned to a different center frequency corresponding to the frequencies of each letter. For example, the first band pass filter might pass signals between 205 and 207 kilocycles and the second one from 209 to 211 kilocycles.

A mixer 69 follows each filter 68 and crystal oscillators 71 furnish second inputs to the mixers 69. The mixers 69 beat the incoming signals down to a frequency range from 20 to 33 kilocycles in third of a kilocycle steps. This range is used to excite the mechanical resonator assemblies, designated generally as 72.

The resonator assemblies contain five individual mechanical resonators 73. They are best shown in Figure 4 and comprise metal rods 74 which are supported at their velocity nodes. A conductor forms a coil 77 about each rod adjacent the fixed end and a biasing magnet 78 is mounted adjacent each coil. The coils 77 are connected to segments 79 mounted about the path of a commutator brush 81.

The commutator brush 81 is connected electrically to a mixer 69. It is to be realized, of course, that there is a brush for each of the thirty-three channels.

The rods 74 are excited when the brush 81 contacts their respective segments 79 if the incoming signal is in the channel of the brush 81. The brushes 81 are driven by the synchronous motor 51 through shaft 53.

A second commutator brush 82 is mounted on shaft 53 and contacts the segments 79 as it rotates in synchronism with the brush 81. However, the brush 82 lags the brush 81 by an angle approximately equal to the angle between adjoining segments 79. The brushes 82 are electrically connected to diode clippers 83 which have a common threshold bias so that they conduct only above a certain level.

The cathodes of all the diode clippers are connected together and to a band pass filter 84. The band pass filter 84 might pass all signals from 20 to 33 kilocycles, for example. Thirty-three filters 86 are connected to the band pass filter 84 with each having band pass characteristics with the center frequencies spaced 330 cycles per second apart between 20 and 33 kilocycles. Thus, each filter corresponds to one of thirty-two characters and the thirty-third one corresponds to the "off" frequency.

The output of each filter 86 is connected to a relay 87 which actuates a printer to print the particular character associated with the channel.

Thus, it is seen that this invention provides means for transmitting intelligence in the presence of noise with a lower signal to noise ratio than heretofore possible. This is accomplished in two ways. First by concentrating the energy available to send each character into one pulse rather than distributing it amongst five and secondly by using the high Q magnetostrictive resonators in conjunction with the corrective $e^{+at}$ modulation and the modulation by the expected shape of the envelope of the incoming wave (cosine squared pulses). The methods used to obtain the second source of improvement result in improved filtering and detection and are widely applicable to communication problems and systems other than the one described.

Although this invention has been described with respect to a particular embodiment thereof, it is not to be so limited as changes and modifications may be made therein which are within the full intended scope of the invention as defined by the appended claims.

I claim:

1. In a communication system, a receiving station comprising a receiving antenna, a mixer receiving the incoming signal from said antenna, a local oscillator supplying an input to said mixer, a filter passing one of the frequency components from said mixer, a second mixer receiving an input from said filter, a second oscillator furnishing an input to said second mixer, a first servo motor receiving the output of said second mixer, an output shaft of the servo motor connected to frequency control means of said local oscillator, a crystal oscillator, a phase detector receiving inputs from said crystal oscillator and said first mixer, a second servo motor receiving the output of said phase detector, said second servo motor shafted to frequency controlling means on said crystal oscillator to synchronize it with the modulation of the incoming signal, a first modulator receiving inputs from the crystal oscillator and the first mixer to modulate the signal with a cosine squared wave, a wave shaper receiving an input from said crystal oscillator and producing an output wave which has a shape fulfilling the mathematical relationship of $e^{+at}$ where $e$ is the base of the natural logarithm, $a$ is the constant, and $t$ is time, a second modulator receiving the output of said wave shaper and the output of the first modulator, a synchronous control motor receiving an input from said crystal oscillator, a first rotating brush driven by said control motor, a detector receiving an output from said first filter and furnishing an input to said first rotating brush, a pair of contacts engaged by said rotating brush, a phase motor connected to the housing of the control motor to rotate it and receiving an input from said two contacts, a plurality of groups of mechanical resonators with each group tuned to a different frequency corresponding to a character, each group of resonators having individual resonators each connected to a contact, a second rotating brush for each group of resonators shafted to said control motor and engageable with said contacts, said contacts receiving the output of the second modulator, a third rotating brush shafted to said control motor and engageable with said contacts, and an output circuit connected to each of said third rotating brushes to determine which channel was energized.

2. A receiver for receiving a signal which has a low signal to noise ratio comprising a receiving antenna, a radio frequency stage attached to said antenna and receiving said incoming signal and heterodyning it down to an intermediate frequency, a crystal oscillator synchronized with the modulation of the incoming signal, a first modulator receiving the output of the radio frequency stage, said first modulator receiving an input from said crystal oscillator which has a shape fulfilling the mathematical function of cosine squared and modulating the output of the radio frequency stage, a wave shaper receiving an input from said crystal oscillator and producing an output which has a shape fulfilling the mathematical function of an exponential curve, a second modulator receiving the output of the first modulator and the output of said wave shaper and modulating the signal with the wave of exponential shape, a plurality of mechanical resonators each tuned to a different frequency receiving the output of said second modulator, and resolving means connected to the mechanical resonators to determine which one of them is energized.

3. A receiver for receiving a signal which has a low signal to noise ratio comprising a receiving antenna, a radio frequency stage receiving an output from said antenna and heterodyning it down to a lower frequency, a first modulator receiving an input from said radio frequency stage, a first oscillator supplying an input to said first modulator and modulating the incoming signal 100 percent, a second modulator receiving the output of the first modulator to modulate it, a wave shaper receiving an input from the first oscillator and supplying an output to the second modulator and producing a wave which fulfills the mathematical function of $e^{+at}$, where "$e$" is the base of the natural logarithms, "$a$" is a constant and "$t$" is time, a second oscillator supplying a synchronizing signal to the first and second modulators so that the phase of the modulating waves are the same as the modulation of the incoming signal, a plurality of electromechanical resonators each tuned to a different frequency corresponding to a different character receiving the output of the second modulator and one of said resonators energized by each incoming pulse, and an output circuit connected to said plurality of resonators to detect which one of them was energized.

4. A receiver for detecting a signal which has a low signal to noise ratio comprising an antenna, a radio frequency stage connected to said antenna and producing an intermediate frequency output, a first oscillator producing an output with a shape which satisfies the mathematical relationship of the cosine squared, a first modulator receiving the output of said radio frequency stage and an input from said first oscillator to modulate the intermediate frequency signal 100 percent thereby, a wave shaper connected to the first oscillator and producing a wave which satisfies the mathematical relationship of $e^{+at}$, where "$e$" is the base of the natural logarithms, "$t$" is time and "$a$" is an arbitrary constant, a second modulator receiving the output of the first modulator and the output of the wave shaper, and a plurality of detecting means connected to the output of the second modulator to determine which one of a plurality of inputs is present.

References Cited in the file of this patent

UNITED STATES PATENTS

| | | |
|---|---|---|
| 1,261,290 | Rainey | Apr. 2, 1918 |
| 1,558,231 | Bruce | Oct. 20, 1925 |
| 1,647,609 | Cotter | Nov. 1, 1927 |
| 1,763,751 | Bown | June 17, 1930 |
| 1,814,956 | Ohl | July 14, 1931 |
| 1,851,092 | Fetter | Mar. 29, 1932 |
| 1,975,486 | Thomas | Oct. 2, 1934 |
| 2,065,890 | Farnham | Dec. 29, 1936 |
| 2,381,928 | Roberts | Aug. 14, 1945 |
| 2,558,489 | Kalfaian | June 26, 1951 |